Patented June 21, 1932

1,864,428

UNITED STATES PATENT OFFICE

HENRY A. GARDNER, OF WASHINGTON, DISTRICT OF COLUMBIA

MANUFACTURE OF CELLULOSIC MATERIALS

No Drawing.   Application filed October 24, 1930.   Serial No. 491,092.

This invention relates to improvements in the manufacture of cellulosic materials; and it relates to a process wherein polymerized formaldehyde or acetaldehyde is incorporated into a cellulosic solution prior to extrusion to form sheets or filaments; and it also comprises as a new material strengthened cellulosic products produced by the said process, the said products also being delustered if desired; all as more fully hereinafter set forth and as claimed.

In the manufacture of artificial silk and related products such as sheets like those known as cellophane, it has become of importance to reduce the high luster of the usual products. The luster may be reduced to the point where the said products more closely resemble natural silk, and it is sometimes desired to reduce it to a point where the products become only slightly translucent. Many methods for delustering artificial silk have been suggested in the art. My prior U. S. Patent No. 1,768,401 describes such a process.

The product of my acknowledged patent represents a departure from the prior art in that the material causing the delustering effect is not usually added as a preformed fine solid but is one which usually goes out of solution or is precipitated during the drying of the extruded products and also in that the added material tends to strengthen instead of to weaken the resulting product. The delustering agents used in my patent are resinous condensation bodies such as the condensation product of an aldehyde with a toluene sulphonamid. It has been found by experience that not only is a delustering result often obtained but the thread is materially strengthened, whereas, in the use of preformed solids such as inorganic pigments for delustering, in all cases there has been a weakening result on the thread; possibly because of lack of bond between the material of the thread and the incorporated solids. This weakening effect is extremely undesirable; lack of strength, particularly with wet materials, being one of the inherent disadvantages of artificial over natural silk.

The present invention represents a further advance in the art. I have now discovered certain addition agents which may be added in solid form to the liquid compositions prior to extrusion and which exert a specific hardening or strengthening action on the extruded thread or film. If added in proper proportions these agents also cause a delustering effect. My addition agents comprise the polymerization products of an aldehyde, such as formaldehyde and acetaldehyde, which are solid at ordinary temperatures. Examples of these products are paraformaldehyde, trioxymethylene and metaldehyde. By the term polymerization products of an aldehyde I do not mean to include hexoses such as the so-called formose; which are not strictly polymerization products of the aldehydes. The polymerization products of formaldehyde are advantageous.

When the strengthening action alone is desired, I usually incorporate an amount of the delustering agent amounting to only about 1 to 5 per cent of the resulting product. This may be increased up to amounts as high as 25 per cent when a high delustering effect is also desired. Amounts up to 10 to 15 per cent are advantageous, producing both delustering and strengthening effects.

My process is applicable in all of the present artificial silk processes but appears especially advantageous in those processes which produce cellulose esters and ethers. My process is applicable in the formation of threads, strips or sheets. The results which I have obtained indicate the probability of a chemical reaction between the strengthening agent and the molecule of cellulose or cellulose derivatives such as the esters and ethers. This appears to be the only plausible explanation of the strength which is imparted even to a regenerated cellulose product. In the nitrocellulose process, for example, it might have been expected that, upon denitration of the extruded material with sodium sulphydrate, the strengthening effect would be reduced or destroyed. The fact is, however, that the denitrated product is greatly strengthened when produced by my process. The same is true of the viscose process. The presence of caustic in the viscose solution probably causes a rapid conversion of my strengthening agents to other non-analogous products. But either this conversion does not take place until after the said agents have had the opportunity to react and to form stable compounds with cellulose, or else the conversion products caused by the caustic are none the less applicable in my process. Much the same results occur in the cupro-ammonium process.

To give a specific example of the increase of strength produced by a small quantity of my formaldehyde reagents I have found that the addition of 2 per cent by weight of paraformaldehyde, based upon the weight of the cellulose ester employed, usually increases the strength of the final finished silk anywhere from 10 to 20 per cent of the strength that would normally be shown in the absence of the formaldehyde treatment.

It is frequently advantageous to also add resinous condensation products to the cellulose solutions in addition to my polymerized formaldehyde and acetaldehyde products. From 2 to 4 per cent of para toluenesulphonamid-formaldehyde resin may be added, for example. The resulting products are considerably stronger than those which are made with the polymerized aldehyde delusterants alone. The resinous condensation products applicable include not only toluenesulphonamid-formaldehyde condensation products, but glycerine-phthalate esters and glycerine-rosin esters may be used.

In my prior Patent No. 1,564,664, I refer to the use of certain forms of toluenesulphonamid-formaldehyde condensation products in cellulose esters, these products giving clear filaments or films with such esters and greatly adding to the strength thereof. I have for some time been employing these types of formaldehyde resins in artificial silk and I obtain clear filaments having from 10 to 20 per cent greater tensile strength than would be shown with the filaments without these resinous aldehyde bodies. Similarly when I employ the more highly condensed forms of toluenesulphonamid-aldehyde resins which are specifically referred to in Patent No. 1,768,401 I obtain filaments which have great strength, but these filaments are delustered at the same time. It is obvious therefore, that the aldehyde resins of the toluenesulphonamid type may be used to obtain silk of high strength and which will exhibit a clear transparent appearance or a dull opaque appearance according to the degree of condensation to which the resin has been subjected.

I can add my strengthening agents in dry form to the cellulosic solutions before extrusion, but it is convenient to make a paste or dispersion in some type of liquid. Thus, I may finely grind a delusterant such as paraformaldehyde in about an equal weight of alcohol. If a resinous condensation product is also to be added to the cellulose material, this is conveniently admixed with the above paste; using, for example, 1 part of paraformaldehyde, 1 part of resin and 2 parts of alcohol. The resulting mixture may then be incorporated in a cellulose nitrate or acetate solution, for example, in proper proportions to give the desired effect in the final product. In some cases, where it is also desired to incorporate a delustering pigment in the final product, this may also be conveniently added to the above paste, usually about 10 per cent of the amount of paraformaldehyde or resin used. Titanium oxide and zirconium oxides are examples.

In a specific embodiment of my invention I may take the following materials:

| | |
|---|---|
| Nitrocellulose | 100 pounds |
| Para toluenesulphonamid-formaldehyde resin | 3 pounds |
| Paraformaldehyde | 1 pound |
| Titanium oxide | 6 ounces |
| Ether | 200 pounds |
| Alcohol | 200 pounds |

In the above mixture the nitrocellulose is first dissolved in the solvents, then there is added to this mixture the toluene resin, the paraformaldehyde and the titanium pigment which have been separately ground in a pebble mill with their own weight of alcohol to secure a fine dispersion. Upon extrusion of the complete mixture, filaments are obtained which, after denitration, exhibit a very pleasing opalescent appearance, a high strength and great softness.

In the manufacture of cellulose acetate silk I may dissolve 100 pounds of cellulose acetate in 400 pounds of acetone and add thereto a milled mixture of 2 pounds of toluenesulphonamid-aldehyde resin and 4 pounds of paraformaldehyde and 4 pounds of alcohol. No pigment is necessary in this instance. The finished silk is soft, of high strength and highly delustered.

The products resulting from the above described processes are highly satisfactory from every viewpoint. While considerably stronger than products of the prior art they are still soft and possess a fairly clear, very slightly opalescent or an obviously dull mat finish according to the quantity of strengthening agent used.

What I claim is:

1. In the manufacture of strengthened cellulosic materials by extrusion of a cellulosic solution, the step which comprises admixing with the said cellulosic solution prior to extrusion insoluble polymerization products of an aldehyde, the said polymerization products being solids at ordinary temperatures.

2. In the manufacture of strengthened cellulosic materials by extrusion of a cellulosic solution, the step which comprises admixing with the said cellulosic solution prior to extrusion insoluble polymerization products selected from a class consisting of paraformaldehyde, trioxymethylene and metaldehyde.

3. In the manufacture of artificial silk the step which comprises admixing with the cellulosic solution prior to extrusion a polymerization product of formaldehyde, solid at ordinary temperatures.

4. In the manufacture of strengthened cellulosic materials by extrusion of a cellulosic solution, the step which comprises adding paraformaldehyde to the said cellulosic solution prior to extrusion.

5. In the manufacture of strengthened cellulosic materials by extrusion of a cellulosic solution, the step which comprises admixing with the said cellulosic solution prior to extrusion from 1 to 25 per cent by weight of insoluble polymerization products of an aldehyde, the said polymerization products being solids at ordinary temperatures.

6. In the manufacture of strengthened cellulosic materials by extrusion of a cellulosic solution, the step which comprises adding from 1 to 25 per cent by weight of paraformaldehyde to the said cellulosic solution prior to extrusion.

7. In the manufacture of strengthened cellulosic materials by extrusion of a cellulosic solution, the step which comprises admixing with the said cellulosic solution prior to extrusion inorganic pigments and insoluble polymerization products of an aldehyde, the said polymerization products being solids at ordinary temperatures.

8. In the manufacture of strengthened cellulosic materials by extrusion of a cellulosic solution, the step which comprises adding inorganic pigments and paraformaldehyde to the said cellulosic solution prior to extrusion.

9. In the manufacture of strengthened cellulosic materials by extrusion of a cellulosic solution, the step which comprises admixing with the said cellulosic solution prior to extrusion resinous condensation products and insoluble polymerization products of an aldehyde, the said polymerization products being solids at ordinary temperatures.

10. In the manufacture of strengthened cellulosic materials by extrusion of a cellulosic solution, the step which comprises adding resinous condensation products and paraformaldehyde to the said cellulosic solution prior to extrusion.

11. In the manufacture of strengthened cellulosic materials by extrusion of a cellulosic solution, the step which comprises admixing with the said cellulosic solution prior to extrusion inorganic pigments, resinous condensation products and insoluble polymerization products of an aldehyde, the said polymerization products being solids at ordinary temperatures.

12. In the manufacture of strengthened cellulosic materials by extrusion of a cellulosic solution, the step which comprises adding inorganic pigments, resinous condensation products and paraformaldehyde to the said cellulosic solution prior to extrusion.

13. Strengthened extruded cellulosic materials containing the residues of the polymerization products of an aldehyde which are solid at ordinary temperatures, the said residues resulting from the addition of the said polymerization products prior to extrusion of said materials.

14. Strengthened extruded cellulosic materials containing the residues of paraformaldehyde, the said residues resulting from the addition of the said paraformaldehyde prior to extrusion of said materials.

15. Strengthened extruded cellulosic materials containing the residues of the polymerization products of an aldehyde which are solid at ordinary temperatures, the said residues resulting from the addition of the said polymerization products prior to extrusion and occurring in quantities sufficient to deluster the said cellulosic materials.

16. Strengthened extruded cellulosic materials containing the residues of paraformaldehyde, the said residues resulting from the addition of the said paraformaldehyde prior to extrusion and occurring in quantities sufficient to deluster the said cellulosic materials.

17. Strengthened extruded cellulosic materials containing an inorganic pigment and the residues of the polymerization products of an aldehyde which are solid at ordinary temperatures, the said residues resulting from the addition of the said polymerization products prior to extrusion.

18. Strengthened extruded cellulosic materials containing an inorganic pigment and the residues of paraformaldehyde, the said residues resulting from the addition of the said paraformaldehyde prior to extrusion.

19. Strengthened extruded cellulosic materials containing resinous condensation products and the residues of the polymerization products of an aldehyde which are solid at ordinary temperatures, the said residues resulting from the addition of the said polymerization products prior to extrusion.

20. Strengthened extruded cellulosic materials containing inorganic pigments, resinous condensation products and the residues of the polymerization products of an aldehyde which are solid at ordinary temperatures, the said residues resulting from the addition of the said polymerization products prior to extrusion.

In testimony whereof, I have hereunto affixed my signature.

HENRY A. GARDNER.